L. S. EDLEBLUTE.
Vehicle-Wheel Hub.
No. 222,683. Patented Dec. 16, 1879.
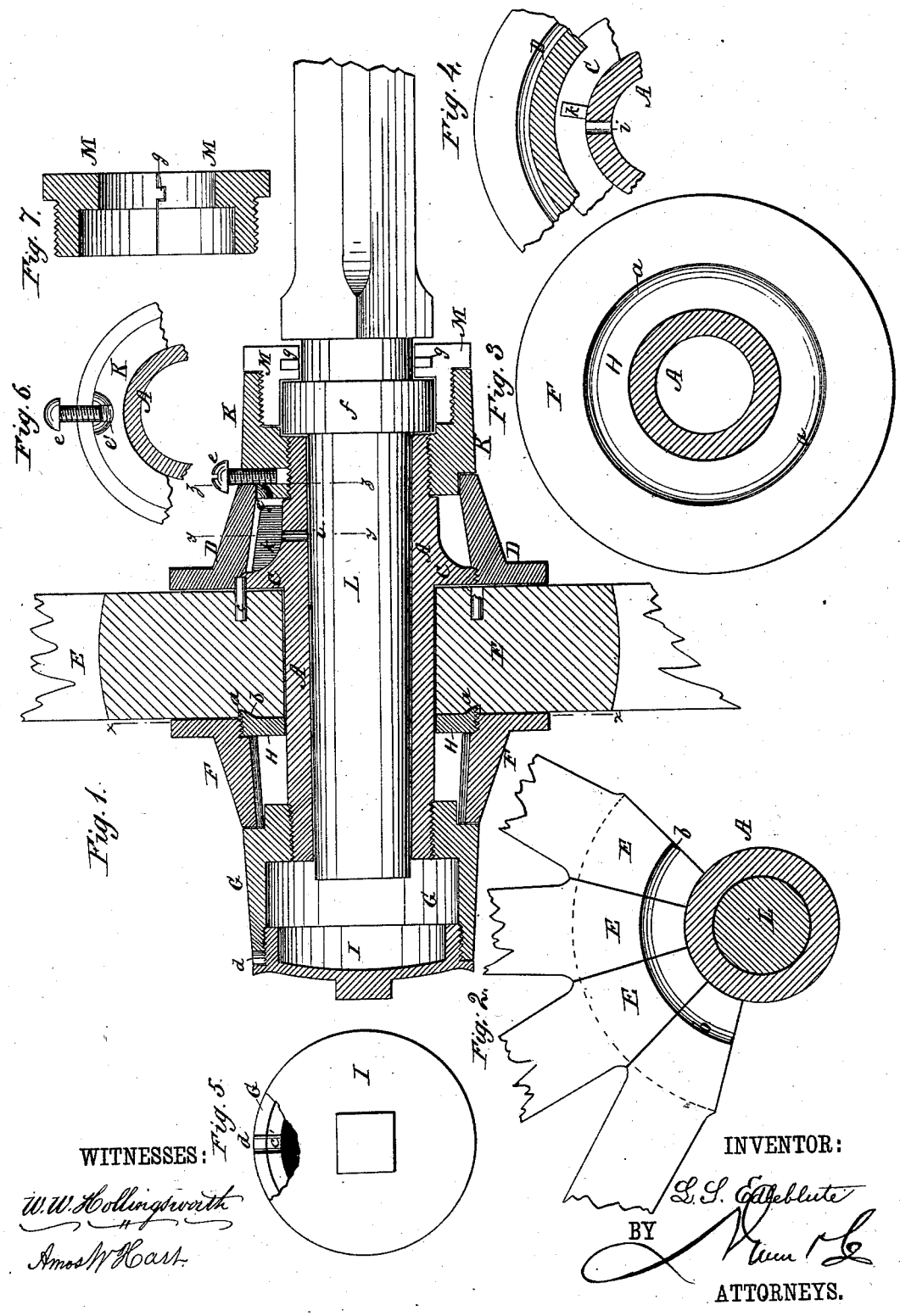

UNITED STATES PATENT OFFICE.

LUCIUS S. EDLEBLUTE, OF CINCINNATI, OHIO.

IMPROVEMENT IN VEHICLE-WHEEL HUBS.

Specification forming part of Letters Patent No. 222,683, dated December 16, 1879; application filed November 7, 1879.

*To all whom it may concern:*

Be it known that I, LUCIUS S. EDLEBLUTE, of Cincinnati, in the county of Hamilton and State of Ohio, have invented a new and useful Improvement in Wheel-Hubs; and I do hereby declare that the following is a full, clear, and exact description of the same.

My invention is an improvement in the class of metal wheel-hubs in which the spoke tenons or butts are clamped between flanged collars, one of which is adjustable on the axle-box to adapt it for convenient adjustment or removal.

My invention pertains to the construction and arrangement of parts, as hereinafter described and claimed.

In the accompanying drawings, forming part of this specification, Figure 1 is a longitudinal central section of my improved wheel-hub. Fig. 2 is a detail vertical section, and Fig. 3 also a vertical section, on line $x\,x$, Fig. 1. Fig. 4 is a detail vertical section on line $y\,y$, Fig. 1. Fig. 5 is an end view of the hub with part broken away. Fig. 6 is a detail section on line $z\,z$, Fig. 1. Fig. 7 is a cross-section of the detachable axle-collar.

The journal or axle-box A is screw-threaded at each end externally, and provided with a circular radial flange, C, which is formed solid with the box, and whose edge is also screw-threaded. The flanged annular nut or hub-section D is screwed on said circular flange C, and the spoke-tenons E are confined between such flanged parts C D and the movable hub-section F, which is similarly flanged, and slides on the axle-box A, and is clamped against the spoke-tenons, as shown, by means of the hollow cylindrical hub-band or nut G, the latter being screwed on the outer end of the box A, and provided with a rabbet or shoulder to form a suitable joint with the section F. Within the inner or face side of the flanged nut or hub-section F is screwed an annular nut, H, which is screw-threaded on its outer edge and has a beveled rib, $a$, on its inner face, which rib enters a corresponding groove, $b$, in the face of the spoke-tenons E, and thus serves to confine the latter firmly, so that they form a solid band around the axle-box. Dowels $c$ are set in the spoke-tenons, Fig. 1, which enter holes or sockets formed in the meeting portions of flange C and hub-section D, and subserve the double purpose of securing the spokes and also said hub-section from rotation around the axle-box.

The outer hub-band, G, is closed by a shouldered nut, I, having a hole, $c'$, drilled through its threaded rim. A notch, $d$, is also formed in the edge of the hub-band G, and when said nut is adjusted so that its hole $c'$ registers with the notch $d$, Fig. 5, it permits supplying lubricant to the interior or chamber of the hub-band, from which it finds its way between the friction-surfaces.

The inner hub-band, K, is screwed on the axle-box A and against the flanged nut or hub-section D, and is locked therewith by means of a key or screw, $e$, inserted in a hole, $e'$, formed in their adjacent or meeting edges, Figs. 1 and 6. The hub and wheel is held on the axle L by engagement of the fixed circular collar $f$ of the latter with a two-part detachable collar or annular nut, M, having a portion of its periphery reduced in thickness and screw-threaded to adapt it to screw into the hub-band K.

The collar M is divided transversely in halves or equal parts, whose ends are doweled together, as shown in Fig. 7. This construction adapts said collar to be easily and quickly applied to or removed from the axle L. When in place on the latter, and the ends of its halves are adjusted so that the dowels $g$ prevent lateral movement of either half, the collar may be screwed into the hub-band K, by which the axle-collar $f$ is confined between said movable collar and hub-band. The wheel may obviously be detached from the axle by screwing out the halved collar M.

To provide for proper supply of lubricant to the inner end of the hub-bearing, I utilize the annular space or chamber formed between the axle-box A and hub-section D. Oil is supplied to said chamber through the same hole in which the screw-key $e$ is inserted. The oil finds its way to the interior of the axle-box through a hole, $i$, formed in the latter; and in order to insure a constant supply I provide the axle-box with a lengthwise rib or flange, $k$, adjacent to said oil-hole $i$. As the hub rotates this rib or flange takes up a small quantity of oil and carries it around with it, so that the mouth of the hole is covered with oil at each rotation.

The several metal parts which are detachable from the axle-box are provided with grooves or sockets to receive a wrench for screwing them on or off.

By the above-described construction and arrangement of parts I form a very firm, strong, and durable hub, whose parts may be readily put together or taken apart, and which is adapted to carry a comparatively large supply of lubricant.

What I claim is—

1. In a wheel-hub, the combination, with an axle-box having a circular flange whose edge is screw-threaded, of the hollow hub-section D, which is screwed on said flange, and whose inner or vertical face is flush with and forms a radial continuation of the same, as shown and described.

2. In a wheel-hub, the combination of the spoke-tenons having dowels projecting laterally, the flange C of the axle-box, and the hub-section D, having sockets formed in their meeting edges to receive said dowels, as shown and described, whereby the spokes and hub-section are locked with the axle-box.

3. In a wheel-hub, the band of spoke-tenons having a circular groove formed in the side thereof, the annular nut H, having a circular rib, a, and the hub-section F, into the vertical face of which said nut is screwed, as shown and described.

4. In a wheel-hub, the combination of the hub-band and its nut with the flanged axle-box, having its outer end screw-threaded, and with the hub-section F, said hub-band having a shouldered joint to adapt it for connection with the latter, as shown, and said nut and hub-band having, respectively, a hole and notch which may be brought into coincident position to permit introduction of lubricant into the outer hub-chamber, as specified.

5. In a wheel-hub, the combination of the two-part exteriorly-threaded and removable collar M with the axle having a fixed collar, hub-band K, and the hub-section D, substantially as shown and described.

6. In a wheel-hub, the exteriorly-threaded detachable collar M, formed of two equal parts, which have a dowel-connection, in combination with the hub-band K, into which the same is screwed, as shown and described.

7. In a wheel-hub, the axle-box having an oil-hole and a contiguous lengthwise rib or flange, and the surrounding hub-section, and parts for closing the ends of the same, to form an oil-chamber, all combined as shown and described.

LUCIUS S. EDLEBLUTE.

Witnesses:
W. T. MATTHEWS,
JAS. T. BROWN.